United States Patent [19]

Denny et al.

[11] 3,947,853

[45] Mar. 30, 1976

[54] SUBSCRIPTING, SUPERSCRIPTING, AND CHARACTER HEIGHT COMPRESSION IN INK JET PRINTING APPARATUS

[75] Inventors: Clifford M. Denny; Hugh E. Naylor, III; Thomas H. Williams, all of Lexington, Ky.

[73] Assignee: International Business Machines Corporation, Armonk, N.Y.

[22] Filed: Dec. 20, 1973

[21] Appl. No.: 426,764

Related U.S. Application Data

[63] Continuation of Ser. No. 297,115, Oct. 12, 1972, abandoned.

[52] U.S. Cl. .................... 346/75; 178/30; 197/1 R; 340/324 AD

[51] Int. Cl.[2] .................... G01D 15/18

[58] Field of Search.... 346/75; 340/324 AD, 324 A; 197/1 R; 354/6; 178/30

[56] References Cited

UNITED STATES PATENTS

| | | | |
|---|---|---|---|
| 3,182,126 | 5/1965 | Ascoli | 178/30 |
| 3,568,178 | 3/1971 | Day | 340/324 AD |
| 3,759,359 | 9/1973 | Stellmach | 197/1 R |
| 3,789,422 | 1/1974 | Haskell et al. | 346/75 |

*Primary Examiner*—Joseph W. Hartary
*Attorney, Agent, or Firm*—D. Kendall Cooper

[57] ABSTRACT

Techniques are described for producing superscripts (half indexing), subscripts, and character height reduction for an ink jet printer.

12 Claims, 7 Drawing Figures

SUBSCRIPTING, SUPERSCRIPTING, AND CHARACTER HEIGHT COMPRESSION IN INK JET PRINTING APPARATUS

This is a continuation, of application Serial No. 297,115 filed October 12, 1972 now abandoned.

PATENT APPLICATION OF INTEREST

U.S. Pat. application Ser. No. 266,790 filed June 27, 1972, entitled "Ink Jet Synchronization and Failure Detection System," and having James D. Hill, et al, as inventors, now U.S. Pat. No. 3,769,630.

BACKGROUND OF INVENTION AND PRIOR ART

No superscripting or subscripting for an ink jet apparatus is known.

SUMMARY OF THE INVENTION

Ink jet printing apparatus described herein produces normal character blocks as matrices of 40 drops high (Y direction) by 24 drops wide (X direction). A normal upper case character utilizes a height of 28 drops evenly spaced in the 40 × 24 matrix in the vertical direction. A change of drop charging voltage of 4.1 volts, as an example, will move a drop one drop spacing.

A superscript of subscript character uses the same number of drops used to form a like normal character. However, in generating a superscript of subscript character, the normal drop charging voltage is reduced by ¼, resulting in a character ¾ as high as a normal character, but just as wide. This occurs because nothing is changed in the character matrix in the X direction. If nothing else is done to the superscripting or subscripted characters, their base line will be below that of the base line of similar normal characters. The squashed superscript or subscript character is positioned by superimposing some DC voltage on the drop charging voltages representing such character.

Typically, the minimum charging voltage used on a subscript character must be 20V to get the drop out of the gutter. Font voltages are increased to accomplish this.

Provision is made in the apparatus for producing superscript characters or subscript characters in various circumstances such as when accenting and/or underlining is required, as well as when those operations are not required.

OBJECTS

As a prime object, the present case is concerned with automatically producing superscript and subscript characters intermixed with characters of normal height when required during printing by an ink jet printing apparatus.

The foregoing and other objects, features, and advantages of the invention will be apparent from the following more particular description of the preferred embodiment of the invention as illustrated in the accompanying drawings.

DRAWINGS

In the Drawings

FIG. 1 illustrates an ink jet printing system having provision for printing normal characters as well as superscript and subscript characters.

FIG. 2 illustrates an output circuit for controlling charge electrode voltages during printing of characters, as arranged in the Hill, et al, U.S. Pat. No. 3,769,630 referred to previously.

FIG. 3 represents a modified output circuit arranged with proper switching and a divider network to produce normal characters, superscript characters, and subscript characters.

FIGS. 4, 5, and 6 illustrate various character printing situations involving normal height characters, superscript characters, and subscript characters when accent and underlining is required.

FIG. 7 illustrates the situation during printing of characters with normal height, superscript characters, and subscript characters when accenting and underlining are not required.

DETAILED DESCRIPTION

Reference is made to the Hill, et al, U.S. Pat. No. 3,769,630 for a typical ink jet printing apparatus and for a more detailed description of some of the circuits and hardware involved. However, for an understanding of the present case, FIG. 1 illustrates elements derived from the Hill, et al, application and arranged for the present purpose.

Figure 1:
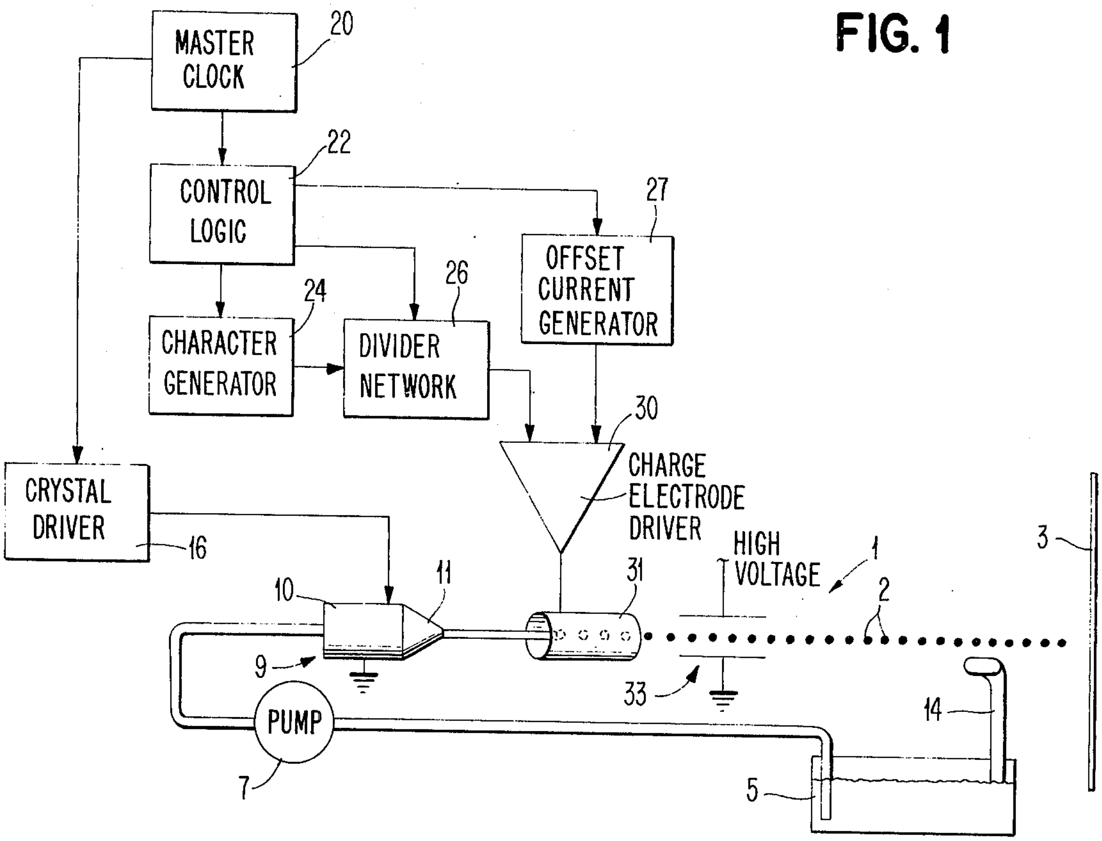

In FIG. 1, a nozzle assembly 1 is arranged to project a stream of ink drops 2 toward a record medium 3 for printing of characters. Ink is supplied from a reservoir 5 by means of a pump 7 to a nozzle structure 9 comprising a crystal 10 and a nozzle orifice element 11 arranged in a known manner to project a stream of ink drops toward record medium 3. Drops not required for printing are directed to a gutter 14 for return to reservoir 5.

Crystal 10 is excited in a known manner at high frequencies by crystal driver circuit 16. As an example, excitation of crystal 10 forms drops in stream 2 at a 100 kiloHertz rate. The timing of the drop formation, as well as other activities in the system, is under control of master clock 20 that drives crystal driver 16, as well as control logic 22. Control logic 22 in turn drives a character generator 24 and as illustrated more completely in other drawings, a divider network 26 and an offset current generator 27. The outputs of circuits 26 and 27, in turn, are applied to a charge electrode driver 30 and ultimately to a charge electrode 31 through which drops 2 pass on their way to paper 3. Variable signals are produced that impart variable charges to drops 2 as they pass through charge electrode 31. Deflection plates 33 are arranged in the path of travel of drops 2 beyond charge electrode 31. These plates have a constant high voltage potential applied between them causing drops to be deflected, the amount of deflection depending upon the amount of charge induced on the individual drops by charge electrode 31.

Figure 2:
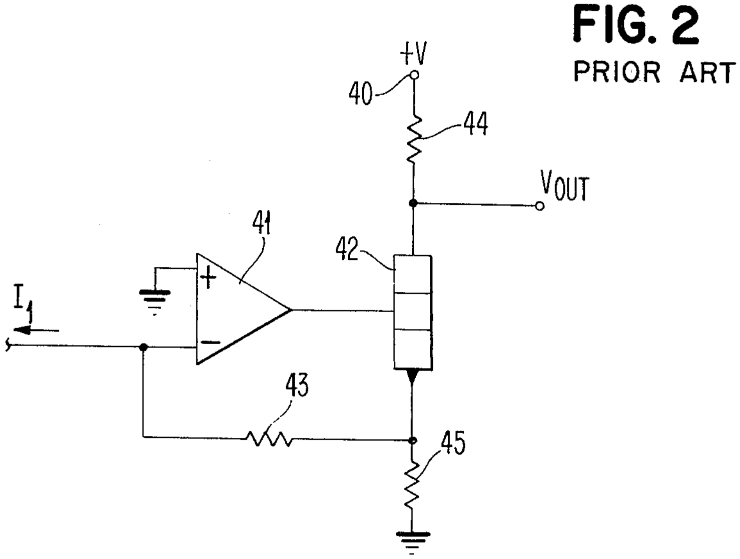
FIG. 2 PRIOR ART

A stairstep generator and a D-A converter (DAC) both have essentially the same output stage as shown in FIG. 2. $I_1$ is the input current which directly controls and determines the output voltage, V out. The voltage +V at terminal 40 is −200 Volts D.C. Output voltages of 20 volts cause drops to appear at the bottom of the 40 drop high by 24 drop wide character box, while output voltages of 180 volts cause drops to appear at the top of the character box. This situation requires a change in output voltage of 4.1 volts [(180–20) /39 = 4.1] to move a drop one position vertically. The circuit in FIG. 2 includes an amplifier circuit 41 controlling a transistor 42 and has various resistor elements 43–45.

Figure 3:
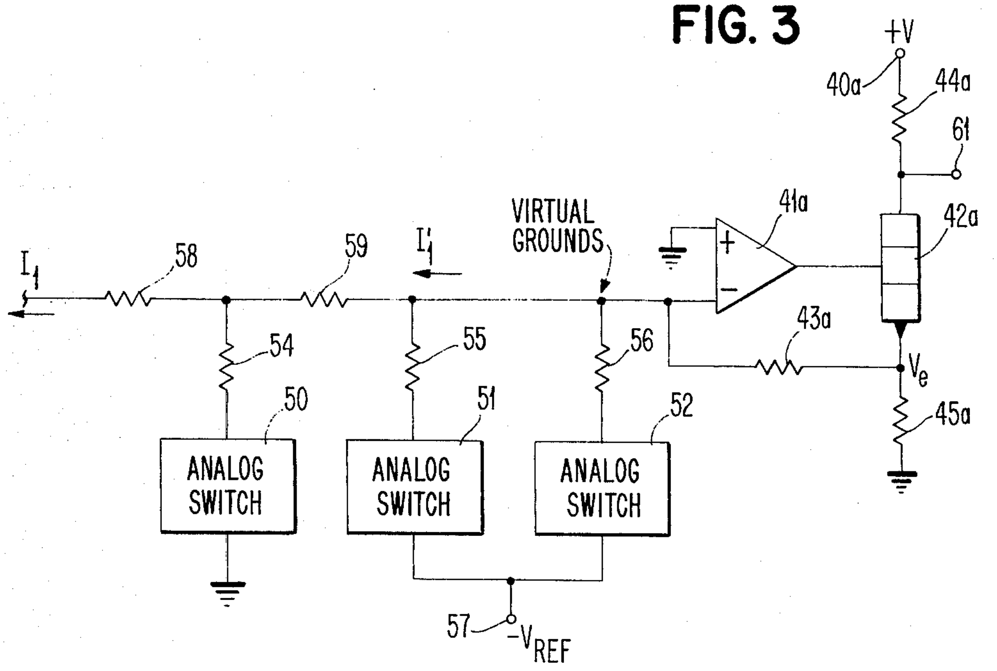

In the present system, the charge electrode driver output circuit of FIG. 2 is modified as shown in FIG. 3 to facilitate superscripting, subscripting and character height compression.

This circuit includes elements 40a–45a corresponding, respectively, to elements 40–45 in FIG. 2. The circuit of FIG. 3 further incorporates three analog switch elements 50–52 with associated resistors 54–56, a negative potential source at terminal 57, and additional resistors 58 and 59.

Current $I_1$ is the input current from the stairstep generator or D-A converter which controls drop charging during character formation. A current divider is formed by resistors 58, 59, and 54, and is controlled by analog switch 50. With switch 50 closed, 25% of $I_1$ is diverted to ground and character height is reduced to 75% of its normal size, thereby reducing the output voltage difference, and hence the spacing between drops. Analog switches 51 and 52, along with resistors 55 and 56 and reference voltage from terminal 57 shift the DC output voltage level, as required, when printing superscripted and subscripted characters. Table I below summarizes circuit operation.

TABLE I

Summary of Operation of Circuit of Figure 3

| Character Type | Character Size | Switch 50 | Switch 51 | Switch 52 |
|---|---|---|---|---|
| Superscript | ¾ | Closed | Open | Open |
| Normal | Normal | Open | Closed | Open |
| Subscript | ¾ | Closed | Closed | Closed |

Illustration of Typical Character Printing Situations

Figure 4:
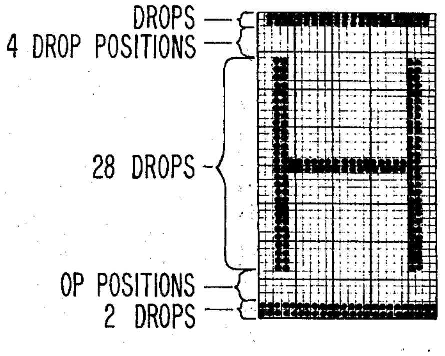
Figure 5:
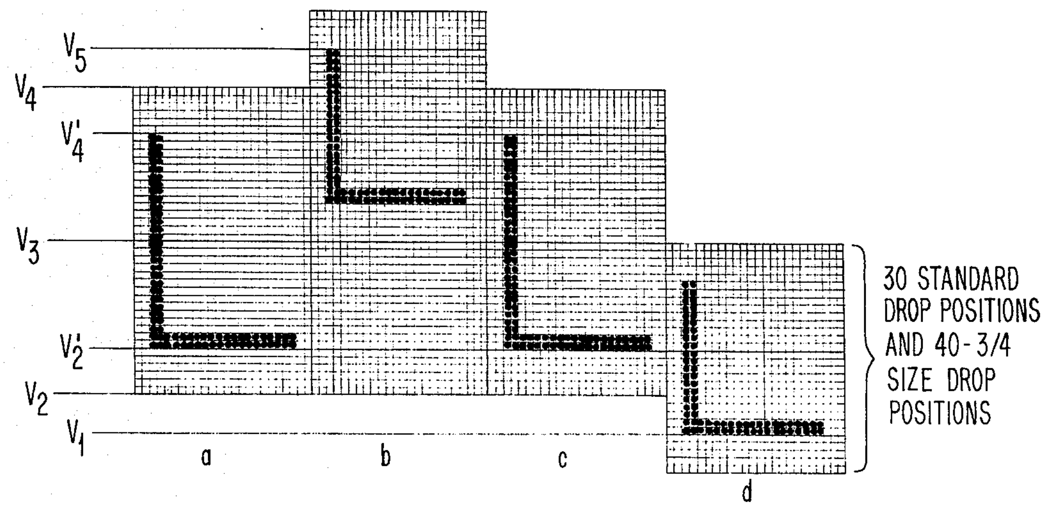
Figure 6:
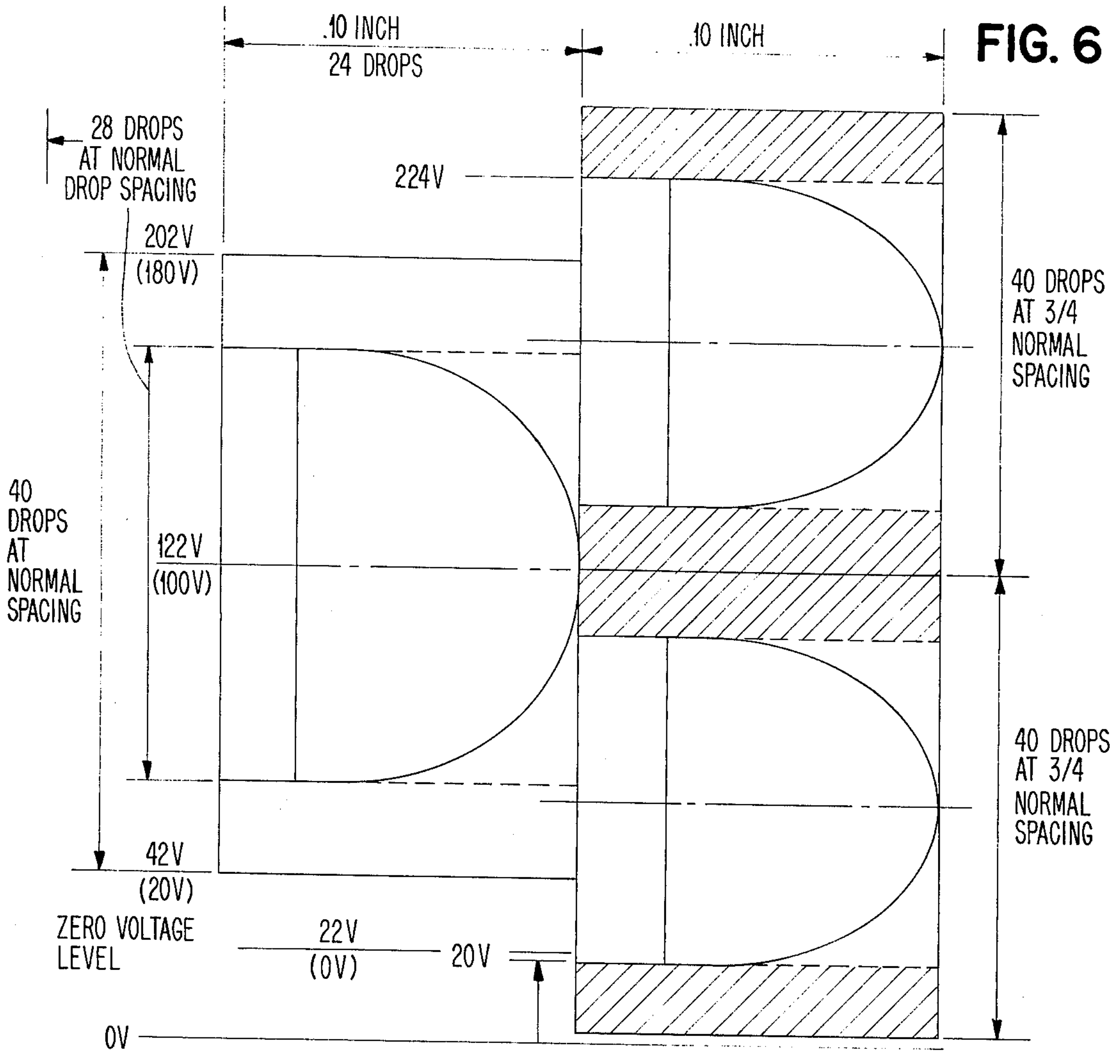
Figure 7:
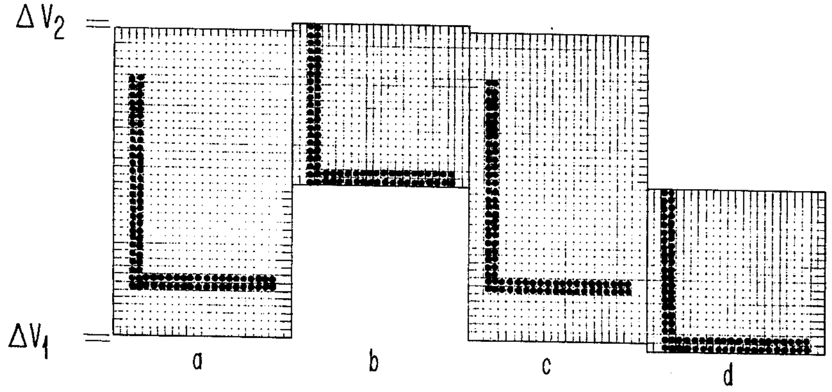

FIGS. 4–7 illustrate various character printing situations encountered in practicing the present invention. FIGS. 4–6 in particular illustrate character printing when accenting and underlining all characters is required while FIG. 7 illustrates character printing without accenting or underlining the subscripted and superscripted characters. All of the FIGS. 4–7 illustrate superscripting and subscripting in accordance with the present invention. In general, it is desired to shift characters up or down approximately one half of a character box for superscripting and subscripting. It is also desired to reduce the vertical height of these shifted characters, by perhaps 25%. It is expensive to have a separate font for smaller characters; therefore the easiest way to reduce character height is to reduce the vertical distance between drops. This is accomplished by reducing the output voltage difference between any two adjacent drop positions from 4.1 volts to 3 volts.

Reducing the center to center distance between drops by 25% (but not reducing the number of drops per vertical scan) causes the vertically compressed character box to be 30 normal drop positions high. An example is shown in FIG. 5. This scheme requires an increase in charge electrode voltage to accommodate those portions of the subscripted and superscripted characters which extend beyond the limits of the normal 40 drop high character box. This additional voltage is from FIG. 5, the sum $\Delta V=(V_5-V_4)+(V_2-V_1)$. As can be seen from the figure, this amounts to 5½ normal drop positions above and 5½ normal drop positions below the normal character box. Therefore, the charge electrode driver supply voltage must be increased by 45 volts (11 position × 4.1 volts/position).

A character with accenting and underlining is illustrated in FIG. 4. By recognizing the fact that subscripts and superscripts are not normally underscored and not normally accented, the height of the subscript/superscript character box can be reduced to 28 drops, the height of such a character which requires the maximum number of drops vertically. FIG. 6 further illustrates specific dimensional relationships of characters with the character "D" shown and typical voltages encountered in a system of this nature.

If the bottom of the reduced size superscripted character is printed starting from the center line of the normal character box, then 28 drops spaced with ¾ of the standard drop separation, will extend 21 standard drop positions above the center line, as shown in FIG. 7. Only one standard drop position of additional charge electrode voltage is thus required (4.1 volts) for a superscripted character. An additional 4.1 volts is required for subscripts, for a total of 8.2 volts additional voltage required by the charge electrode supply voltage.

A 25% reduction in character height for subscripted and superscripted characters is not necessarily optimum. However, it is in a reasonable range and, as shown above, requires only a very small (approx. 5%) increase in charge electrode driver output voltage.

While the invention has been particularly shown and described with reference to a preferred embodiment, it will be understood by those skilled in the art that various changes in form and detail may be made without departing from the spirit and scope of the invention.

What is claimed is:

1. An ink jet printing apparatus for characters along a common base line and of normal height, superscript characters, subscript characters, and compressed characters, on a record medium, and wherein during printing of normal characters, successive drops are separated by a predetermined inter-drop spacing at said record medium established by predetermined inter-drop charge increments, comprising:

means for forming and propelling a stream of ink drops toward said record medium;

charging means operable to variably charge said drops in said stream, and constant deflection means for deflecting said drops in accordance with the charge on said drops in order to form on said record medium at least a line of characters having a normal height range, said characters normally being printed so that they are positioned along a normal common base line and said characters generally extending above said common base line, but some of said characters also normally subtending below said base line each of said characters comprising a series of vertical columns of drops serving to form said characters within a predetermined normal character height range;

driving means for applying a predetermined range of potentials to said charging means in order to deflect drops in said stream from a lower extremity of said normal character height range to an upper extremity of said normal character height range;

supplementary potential means for superimposing a supplementary deflection potential to said charging means in order to establish a different character base line level and thereby print certain characters along a base line that differs from said normal character base line;

compression means interconnected with said supplementary potential means to establish a smaller inter-drop spacing between successive drops directed to said record medium by reducing said inter-drop charge increments whereby each vertical column of drops occupies a shorter range of character height, thereby achieving compression of characters during printing.

2. An ink jet printing apparatus for printing characters along a common base line and of normal height, superscript characters, on a record medium, comprising:

means for forming and propelling a stream of ink drops toward said record medium;

charging means operable to charge said drops in said stream, and deflection means for deflecting said drops in accordance with the charge on said drops in order to form on said record medium at least a line of characters having a normal height range, said characters normally being printed so that they are positioned along a normal common base line and said characters generally extending above said common base line, but some of said characters also normally subtending below said base line each of said characters comprising a series of vertical columns of drops serving to form said characters within a predetermined normal character height range;

driving means for applying a predetermined range of potentials to said charging means in order to deflect drops in said stream from a lower extremity of said normal character height range to an upper extremity of said normal character height range;

supplementary potential means for superimposing a supplementary deflection potential to said charging means in order to establish a different character base line level and thereby print certain characters along a base line that differs from said normal character base line;

a driving circuit incorporated in said driving means for producing a range of charging potentials from a base line reference level during printing of characters;

reference voltage switching means interconnected with said driving means for switching the base line reference level of said charging potentials during printing of characters other than said normal characters.

3. The apparatus of claim 2, further comprising:

a superscript reference potential circuit interconnected with said charging means;

an analog switch for activating said superscript reference circuit; and superscript control means for activating said analog switch when superscript characters are required during printing.

4. The apparatus of claim 2, further comprising:

a subscript reference potential circuit interconnected with said charging means;

an analog switch for activating said subscript reference circuit; and subscript control means for activating said analog switch when subscript characters are required during printing.

5. The apparatus of claim 2 further comprising:

a current divider network interconnected with said driving circuit for producing a potential in order to reduce inter-drop spacing for compression of characters; and switching means for activating said current divider circuit when compression of characters is required.

6. An ink jet printing apparatus for printing characters on a record medium, comprising:

an ink drop source, said ink drop source forming and propelling a stream of ink drops toward said record medium;

charging means positioned along the path of travel of said ink drop stream for variably charging selected drops in said stream in accordance with intelligence signals;

deflection means interconnected with said ink drop source and operable to deflect drops from said stream onto said record medium within a predetermined normal range of character height from a lower extremity to an upper extremity of said normal range and each character normally being printed along a normal character base line;

character generating means including at least a first analog switch means interconnected with said charging means to form on said record medium at least a line of said characters having a normal range of character height along said normal character base line; and supplementary means including at least a second analog switch means interconnected with said character generating means and operable during print operations to control said charging means to selectively establish a character base line position on said record medium that differs from said normal character base line in order to print characters above or below said normal character base line.

7. The apparatus of claim 6, wherein:

said first and second analog switch means are operable in a superscript mode to control said charging means in order to form superscript characters along a base line which is above the normal character base line.

8. The apparatus of claim 6, wherein:

said first and second analog switch means are operable in a subscript mode to control said charging means in order to form subscript characters along a base line which is below the normal character base line.

9. The apparatus of claim 6, further comprising:

compression means including at least a third analog switch means interconnected in said character generating means with said first analog switch means to compress characters in relation to said normal range of character height during printing.

10. The apparatus of claim 6 wherein each character comprises a series of vertical columns of drops within said predetermined normal range of character height, and further comprising:

driving means interconnected with said charging means for applying a predetermined range of potentials to said charging means in order to deflect drops in said stream by uniform increments within said predetermined normal range of character height from said lower extremity to said upper extremity of said normal character height range.

11. The apparatus of claim 10, wherein during printing of normal characters, successive drops in each vertical column are separated by a predetermined inter-drop spacing at said record medium, and further comprising:

compression means including at least a third analog switch means interconnected with said character generating means and operable to provide potentials with smaller uniform inter-drop deflection increments in order to establish a smaller inter-drop spacing between successive drops directed to said record medium whereby each vertical column of drops occupies a shorter range of character height, thereby achieving compression of characters during printing.

12. The apparatus of claim 11, wherein:

said compression means and said character generating means are operable to compress only superscript characters and subscript characters, but not normal characters, as they occur during printing.

* * * * *